(12) United States Patent
Koyama

(10) Patent No.: US 9,280,152 B2
(45) Date of Patent: Mar. 8, 2016

(54) POWER SUPPLYING METHOD FOR INJECTION MOLDING MACHINE HAVING TRANSFORMER

(71) Applicant: FANUC Corporation, Yamanashi (JP)

(72) Inventor: Hideki Koyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/510,638

(22) Filed: Oct. 9, 2014

(65) Prior Publication Data

US 2015/0102760 A1 Apr. 16, 2015

(30) Foreign Application Priority Data

Oct. 15, 2013 (JP) .................................. 2013-214716

(51) Int. Cl.
*G05B 11/32* (2006.01)
*G05B 24/02* (2006.01)
*B29C 45/76* (2006.01)
*H02J 3/00* (2006.01)
(Continued)

(52) U.S. Cl.
CPC ............ *G05B 24/02* (2013.01); *B29C 45/7666* (2013.01); *H02J 3/005* (2013.01); *H02M 1/10* (2013.01); *H02M 5/12* (2013.01); *B29C 2945/7618* (2013.01); *B29C 2945/7624* (2013.01); *B29C 2945/76033* (2013.01); *B29C 2945/76224* (2013.01); *B29C 2945/76454* (2013.01); *B29C 2945/76521* (2013.01); *B29C 2945/76525* (2013.01); *B29C 2945/76943* (2013.01)

(58) Field of Classification Search
CPC ................... Y10T 29/49009; Y10T 29/49012; H02K 11/0073; H02K 1/278; H02K 29/42
See application file for complete search history.

(56) References Cited

U.S. PATENT DOCUMENTS 4,726,751 A * 2/1988 Shibata ................... B29C 45/78
425/144
5,210,698 A * 5/1993 Topmiller ............... B29C 45/76
700/202

(Continued)

FOREIGN PATENT DOCUMENTS

JP 8-149818 A 6/1996
JP 2004-23958 A 1/2004

(Continued)

OTHER PUBLICATIONS

Decision to Grant a Patent mailed Mar. 17, 2015, corresponding to Japanese patent application No. 2013-214716.

*Primary Examiner* — Shawki S Ismail
*Assistant Examiner* — Zoheb Imtiaz
(74) *Attorney, Agent, or Firm* — Hauptman Ham, LLP

(57) ABSTRACT

An injection molding machine has a first servo amplifier configured to operate with a first voltage, a second servo amplifier configured to operate with a second voltage, and a transformer which has a primary side terminal and a secondary side terminal and transforms voltages mutually in a predetermined voltage ratio. A main power supply is connected to a primary side terminal or a secondary side terminal of the transformer, depending on whether a voltage of the main power supply supplied to the injection molding machine is equal to the first voltage or the second voltage, respectively. The first or the second servo amplifier is connected to a terminal of the transformer on the side where the main power supply is not connected.

3 Claims, 2 Drawing Sheets

(51) Int. Cl.
*H02M 5/12* (2006.01)
*H02M 1/10* (2006.01)

(56) References Cited

U.S. PATENT DOCUMENTS 6,292,363 B1 * 9/2001 Shinohara ............ H05K 7/1432
                                                        165/104.33

2013/0154553 A1 * 6/2013 Steele .................. B60L 11/182
                                                        320/108

FOREIGN PATENT DOCUMENTS

| JP | 2007-168177 A | 7/2007 |
| JP | 2010-68568 A  | 3/2010 |

* cited by examiner

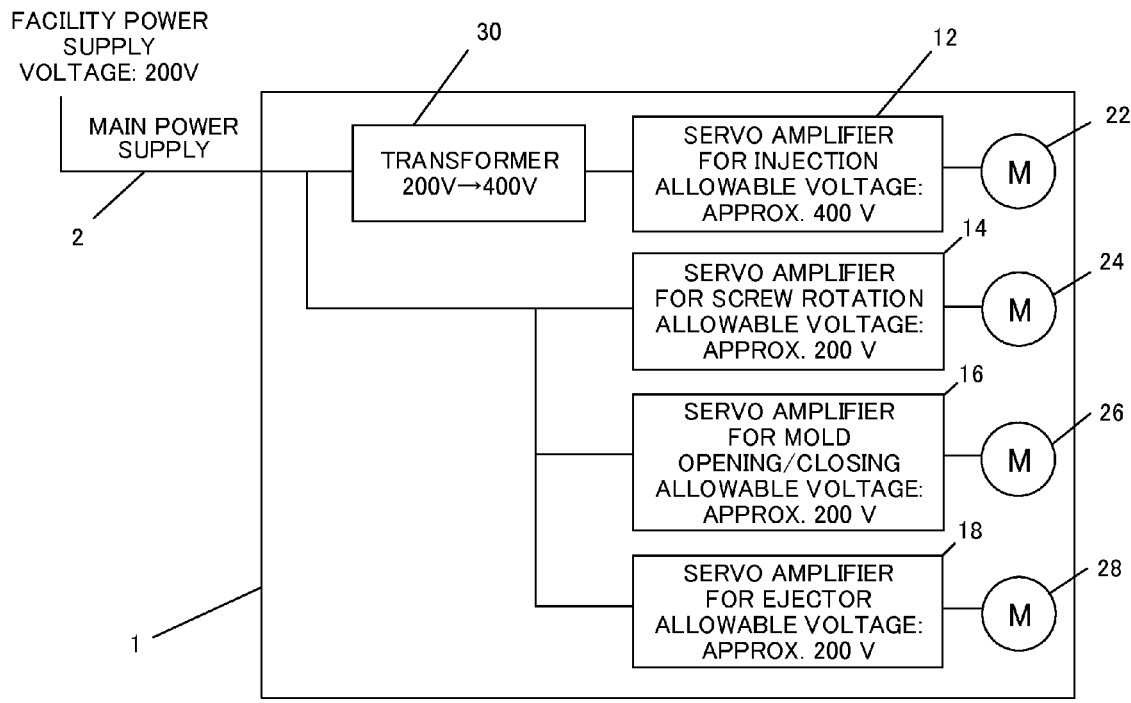
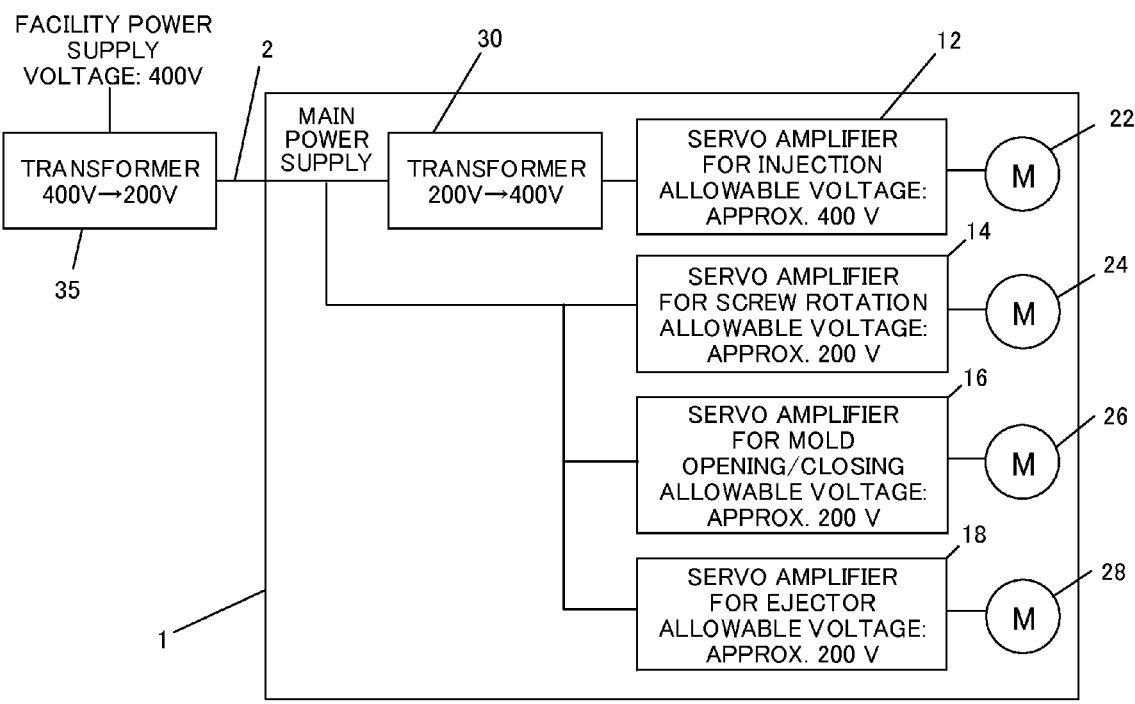

POWER SUPPLYING METHOD FOR INJECTION MOLDING MACHINE HAVING TRANSFORMER

RELATED APPLICATIONS

The present application claims priority to Japanese Application Number 2013-214716, filed Oct. 15, 2013, the disclosure of which is hereby incorporated by reference herein in its entirety.

BACKGROUND OF THE INVENTION

1. Field of the Invention

The present invention relates to a power supplying method for an injection molding machine which has a plurality of kinds of servo amplifiers with different allowable voltages and a transformer for transforming a plurality of kinds of voltages.

2. Description of the Related Art

An injection molding machine is provided with independent servo motors for each driving part (i.e., servo motors for injection, for metering (screw rotation), for mold opening/closing, and for an ejector). Required output of each of these servo motors differs depending on a driving part to which the servo motor is applied. Especially, a motor with higher output power than other servo motors is employed as a servo motor for injection which injects resin into a mold.

If voltage or current of a servo amplifier which drives the servo motor is increased, output of the servo motor is increased accordingly. However, such an increase of current would encounter a limit of output due to a maximum current of a power element in the servo amplifier. Accordingly, for increasing an output further, not only a current to be supplied to the servo amplifier but also a voltage to be applied to the servo amplifier are required to be increased. In such a case, a servo amplifier with input voltage of 400 V is applied as a servo amplifier adaptable to a high voltage, in place of a general servo amplifier with input voltage of 200 V.

As described above, a high output power can be obtained with such a 400 V servo amplifier. On the other hand, in case where such a servo amplifier is used, withstand voltage performance of electric components in the servo amplifier has to be improved. Moreover, in order to improve such withstand voltage performance, it is necessary to extend distances between conductors such as cables and wires, which inevitably makes the servo amplifier larger in size. As a result, if a 400 V servo amplifier is employed for each of servomotors (i.e., servo motors for injection, for metering, for mold opening/closing, and for an ejector) equipped in each driving part in an injection molding machine, these servo amplifiers would undesirably occupy large portions of storage space for control parts of the injection molding machine. Consequently, such an injection molding machine could not store all of these servo amplifiers.

For storing all servo amplifiers in an injection molding machine, it is preferable to apply a 400 V servo amplifier only in a driving part requiring a 400 V servo amplifier, while using a 200 V servo amplifier in a servo motor not requiring such a high output, such as a servo motor for mold opening/closing and a servo motor for an ejector, since a 200 V servo amplifier is smaller in size than a 400 V servo amplifier with the same output power.

FIG. 2 shows an injection molding machine including a 200 V servo amplifier and a 400 V servo amplifier.

An injection molding machine 1 is provided inside with a servomotor at each driving part (a servo motor for injection 22, a servomotor for screw rotation 24, a servomotor for mold opening/closing 26, and a servo motor for an ejector 28). Furthermore, each of the servo motor has a servo amplifier individually (a servo amplifier for injection 12, a servo amplifier for screw rotation 14, a servo amplifier for mold opening/closing 16, and a servo amplifier for an ejector 18). In addition, the injection molding machine 1 includes inside a transformer 30 to transform a voltage of 200 V (voltage of facility power supply) into a voltage of 400 V. The transformer 30 boosts a voltage of 200 V input as a main power supply 2 to a voltage of 400 V for a 400 V servo amplifier.

An injection molding machine disclosed in Japanese Patent Application Laid-Open No. 2007-168177 is the same as the injection molding machine shown in FIG. 2 in that they include both a 200 V servo amplifier and a 400 V servo amplifier in a mixed manner. However, in the case of Japanese Patent Application Laid-Open No. 2007-168177, input voltage value is 400 V and therefore a transformer is provided for a 200 V servo amplifier.

A production facility like an injection molding machine may be relocated between factories for reasons of manufacturing in a factory. Voltage of facility power supply in a factory differs among factories or regions. Therefore, if an injection molding machine is adaptable to only any one voltage of 200 V and 400 V, it is necessary to additionally install a transformer between a facility power supply in a factory and the injection molding machine so as to supply power to the injection molding machine by boosting or lowering a voltage depending on a voltage of the facility power supply. If a proper voltage is not supplied to the injection molding machine, the injection molding machine does not operate properly.

FIG. 3 shows an example of an injection molding machine in which a transformer 35 is additionally installed outside the injection molding machine.

In FIG. 3, a transformer 35 for transforming a voltage from 400 V to 200 V is additionally installed outside an injection molding machine 1, as a voltage of a facility power supply is 400 V while a voltage of a main power supply of an injection molding machine 1 is 200 V. Thus, by installing the transformer 35 outside the injection molding machine 1, it becomes possible to supply a voltage that corresponds to a voltage required for a main power supply of an injection molding machine, even when a voltage of facility power supply in a factory changes, thereby enabling the injection molding machine to operate. However, an additional installation of a transformer is accompanied by problems of cost and installation location. Especially, as the size of an injection molding machine becomes larger, capacity of a transformer increases accordingly, which may also increase a burden for a user.

SUMMARY OF THE INVENTION

An objective of the present invention is to provide a power supplying method used for an injection molding machine, which can deal with differences among facility power supplies with a simple procedure even when the injection molding machine is relocated between different locations.

In a power supplying method for an injection molding machine according to the present invention, the injection molding machine includes a first servo amplifier which operates with a first allowable voltage, a second servo amplifier which operates with a second allowable voltage different from the first allowable voltage, and a transformer having a primary side terminal and a secondary side terminal and configured to transform voltages mutually in a predetermined voltage ratio. The power supplying method includes supplying a voltage by, when the voltage of a main power supply supplied to the injection molding machine is equal to the first allowable voltage, connecting a primary side terminal of the transformer to the main power supply, and connecting the first servo amplifier directly to the main power supply, while connecting the second servo amplifier to a secondary side terminal of the transformer to cause the transformer to transform the voltage of the main power supply in a predetermined voltage ratio. The power supplying method also includes supplying a voltage by, when the voltage of a main power supply supplied to the injection molding machine is equal to the second allowable voltage, connecting a secondary side terminal of the transformer to the main power supply, and connecting the first servo amplifier to a primary side terminal of the transformer to cause the transformer to transform the voltage of the main power supply in the reciprocal of the predetermined voltage ratio, while connecting the second servo amplifier directly to the main power supply.

The power supplying method according to the present invention can deal with difference among facility power supplies by a simple reconstruction even when an injection molding machine is relocated between different factories.

The power supplying method may also include detecting a voltage supplied to the first servo amplifier and a voltage supplied to the second servo amplifier, and issuing an alarm if the voltage supplied to the first servo amplifier deviates from the first allowable voltage and/or the voltage supplied to the second servo amplifier deviates from the second allowable voltage.

According to the embodiment, a voltage to be supplied to a first servo amplifier and a voltage to be supplied to a second servo amplifier are detected, and an alarm is raised when either one of the voltages has deviated from a corresponding allowable voltage. This enables to determine whether an abnormality of a transformer has occurred or an abnormality of a voltage of a main power supply has occurred, depending on whether a voltage which has deviated from an allowable voltage has been detected at a servo amplifier connected to a main power supply via a transformer, or a voltage which has deviated from an allowable voltage has been detected at a servo amplifier connected to a main power supply without interposing a transformer.

The power supplying method may further include detecting a voltage supplied to the first servo amplifier and a voltage supplied to the second servo amplifier, and issuing an alarm if a ratio between the detected voltage to be supplied to the first servo amplifier and the detected voltage to be supplied to the second servo amplifier deviates from a predetermined voltage ratio.

According to the embodiment, a voltage to be supplied to a first servo amplifier and a voltage supplied to a second servo amplifier are detected to obtain a voltage ratio between the servo amplifiers, and an alarm is raised when the ratio has deviated from a predetermined voltage ratio. This enables to detect an abnormality of a transformer, depending on a value of a voltage ratio between the servo amplifiers.

As described above, the present invention enables to provide a power supplying method used for an injection molding machine, which can deal with differences among facility power supplies with a simple procedure even when the injection molding machine is relocated between different locations.

BRIEF DESCRIPTION OF THE DRAWINGS

The above and other objects and features of the present invention will be apparent from the following description of embodiments with reference to the accompanying drawings, in which:

FIG. 2 is a block diagram showing a conventional injection molding machine including a 200 V servo amplifier and a 400 V servo amplifier, when a voltage of a facility power supply (a main power supply) is 200 V; and FIG. 3 is an explanatory drawing showing that a transformer for transforming a voltage from 400 V to 200 V is additionally installed outside the injection molding machine shown in FIG. 2, in order to use the injection molding machine in a location where a voltage of a facility power supply is 400 V.

DETAILED DESCRIPTION OF THE PREFERRED EMBODIMENTS

First, an embodiment of a power supplying method for an injection molding machine is described below with reference to FIG. 1A. Here, a voltage of a main power supply to be supplied to the injection molding machine is 200 V.

Figure 1A:
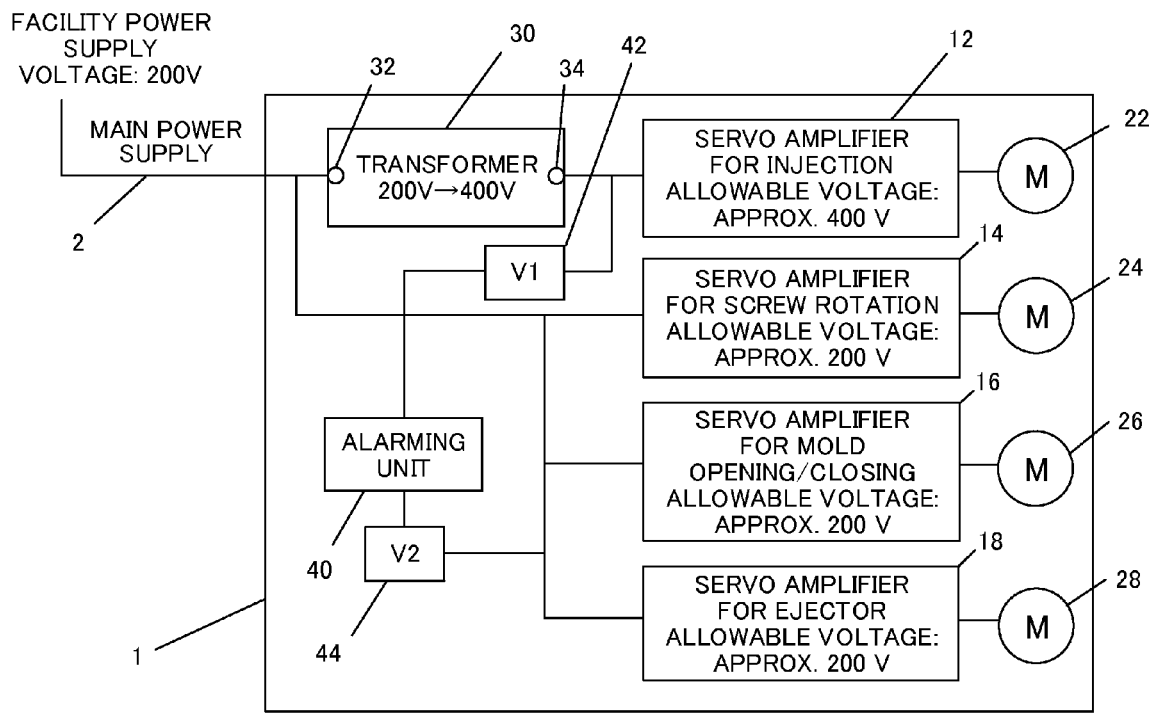
FIG. 1A is an explanatory drawing showing an embodiment of a power supplying method for an injection molding machine according to the present invention, when a main power supply voltage supplied to the injection molding machine is 200 V.

A voltage of a main power supply 2 to be supplied to an injection molding machine 1 shown in FIG. 1A is 200 V. Therefore, a primary side terminal 32 of a transformer 30 is connected to the side of a main power supply 2. Also, a secondary side terminal 34 is connected to the side of a servo amplifier for injection 12, as an allowable voltage of the servo amplifier for injection 12 is 400 V. Other servo amplifiers with an allowable voltage of 200 V (i.e., a servo amplifier for screw rotation 14, a servo amplifier for mold opening/closing 16, and a servo amplifier for an ejector 18) are directly connected to the main power supply 2.

Next, an embodiment of a power supplying method for an injection molding machine is described below with reference to FIG. 1B. Here, a voltage of a main power supply to be supplied to the injection molding machine is 400 V.

Figure 1B:
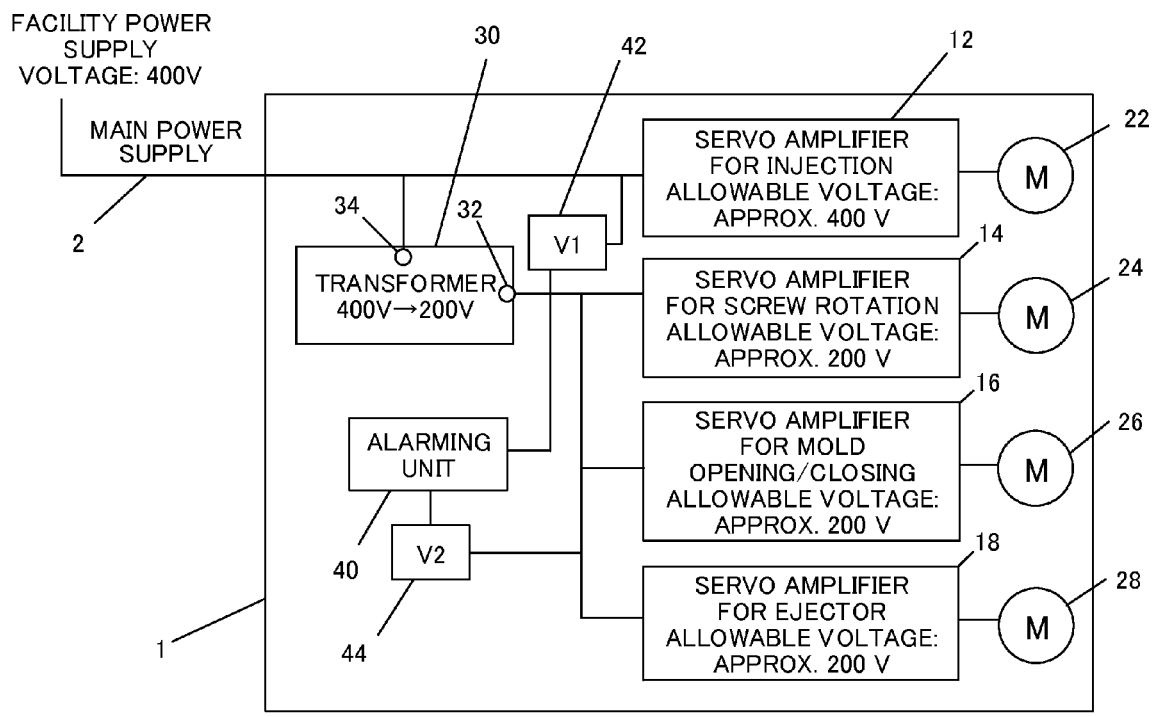
FIG. 1B is an explanatory drawing showing an embodiment of a power supplying method for an injection molding machine according to the present invention, when a main power supply voltage supplied to the injection molding machine is 400 V.

A voltage of a main power supply 2 to be supplied to an injection molding machine 1 shown in FIG. 1B is 400 V. Therefore, a secondary side terminal 34 of a transformer 30 is connected to the side of a main power supply 2. Also, a primary side terminal 32 is connected to the sides of servo amplifiers with an allowable voltage of 200 V (i.e., a servo amplifier for screw rotation 14, a servo amplifier for mold opening/closing 16, and a servo amplifier for an ejector 18). The rest, a servo amplifier for injection 12 with an allowable voltage of 400 V, is directly connected to the main power supply 2. In other words, in the case of the injection molding machine 1 shown in FIG. 1B, a primary side terminal 32 and a secondary side terminal 34 of the transformer 30 are connected to a servo amplifier side and a main power supply side, respectively, whereas in the case of the injection molding machine 1 shown in FIG. 1A, conversely, a primary side terminal 32 and a secondary side terminal 34 of the transformer 30 are connected to a main power supply side and a servo amplifier side, respectively.

With this arrangement, the injection molding machine 1 can deal with voltage difference among facility power supplies by a simple alteration, for example, by interchanging a primary side terminal 32 and a secondary side terminal 34 of the transformer 30 provided in the injection molding machine 1 when these terminals 32 and 34 are used, even when the injection molding machine 1 is relocated between different regions with facility power supplies. Moreover, the method avoids the need for additionally interposing a transformer between a facility power supply and a main power supply as shown in FIG. 3. As a result, cost of a transformer and a burden on installation location for a transformer can be reduced.

Furthermore, as shown in FIGS. 1A and 1B, a first and a second voltage detecting units 42 and 44 may be disposed in front of servo amplifiers to detect voltages supplied to these servo amplifiers. In this case, an alarming unit 40 issues an alarm when the voltage detected by the first voltage detecting unit 42 has deviated from the allowable voltage of approximately 400 V of the servo amplifier for injection 12, or when the voltage detected by the second voltage detecting unit 44 has deviated from the allowable voltage of approximately 200 V of the other servo amplifiers. Various types of alarms such as illumination or blinking of light, an audible alarm like a buzzer, and a vibrating alarm can be used in the alarming unit 40.

With this method, it is possible to determine the type of abnormality, depending on whether the voltage detected by the first voltage detecting unit 42 has deviated from an allowable voltage or the voltage detected by the second voltage detecting unit 44 has deviated from an allowable voltage. For example, in a case of the injection molding machine shown in FIG. 1A, it is possible to determine that a transformer 30 has an abnormality when only the voltage detected by the first voltage detecting unit 42 has deviated from a corresponding allowable voltage. Likewise, it is possible to determine that a voltage of the main power supply 2 is abnormal when not only the voltage detected by the first voltage detecting unit 42 but also the voltage detected by the second voltage detecting unit 44 have deviated from their corresponding allowable voltages. It is also possible to cause the alarming unit 40 to issue different types of alarms, depending on a result of a determination of abnormality.

Besides, instead of determining whether or not voltages detected by the first voltage detecting unit 42 and the second voltage detecting unit 44 have deviated allowable voltages, a ratio between voltage detected by the first voltage detecting unit 42 and voltage detected by the second voltage detecting unit 44 is obtained, and if the obtained ratio has deviated from a predetermined voltage ratio, it is possible to determine that the transformer 30 has an abnormality, causing an alarming unit 40 to issue an alarm. Such a predetermined voltage ratio can be obtained based on characteristics of the transformer.

In the meantime, for lowering cost of a transformer 30 to be assembled in an injection molding machine 1, it is necessary to reduce the capacity of the transformer 30. To achieve this, it is preferable to employ servo amplifiers in combination in such a manner that the power consumed by servo amplifiers with allowable voltage of 400 V and the power consumed by servo amplifiers with allowable voltage of 200 V are equal to each other. For example, a circuit supplied with a voltage of 400 V is connected only with a servo amplifier for injection 12 which requires a high output power, in order to control an increase of power consumption over a possible power consumption in injection process, whereas a circuit supplied with a voltage of 200 V is connected with servo amplifiers other than the servo amplifier for injection 12, which do not require a high output power, as a result, the capacity of the transformer 30 is reduced because concentration of power consumption on one voltage circuit can be avoided. Consequently, the present invention is advantageous in respect of cost and installation location of a transformer, compared with a case where a transformer is installed outside an injection molding machine 1 as shown in FIG. 3.

The invention claimed is:

1. A power supplying method for an injection molding machine,
wherein the injection molding machine includes a first servo amplifier configured to operate with a first allowable voltage, a second servo amplifier configured to operate with a second allowable voltage different from the first allowable voltage, and a transformer having a primary side terminal and a secondary side terminal and configured to transform voltages mutually in a voltage ratio between the first allowable voltage and the second allowable voltage,
the power supplying method comprising:
supplying a voltage by, when the voltage of a main power supply supplied to the injection molding machine is equal to the first allowable voltage, connecting the primary side terminal of the transformer to the main power supply, and connecting the first servo amplifier directly to the main power supply, while connecting the second servo amplifier to the secondary side terminal of the transformer to cause the transformer to transform the voltage of the main power supply in the predetermined voltage ratio; and
supplying a voltage by, when the voltage of a main power supply supplied to the injection molding machine is equal to the second allowable voltage, connecting the secondary side terminal of the transformer to the main power supply, and connecting the first servo amplifier to the primary side terminal of the transformer to cause the transformer to transform the voltage of the main power supply in the reciprocal of the predetermined voltage ratio, while connecting the second servo amplifier directly to the main power supply.

2. The power supplying method for an injection molding machine according to claim 1, further comprising:
detecting a voltage supplied to the first servo amplifier and a voltage supplied to the second servo amplifier, and issuing an alarm if the voltage supplied to the first servo amplifier deviates from the first allowable voltage and/or the voltage supplied to the second servo amplifier deviates from the second allowable voltage.

3. The power supplying method for an injection molding machine according to claim 1, further comprising:
detecting a voltage supplied to the first servo amplifier and a voltage supplied to the second servo amplifier, and issuing an alarm if a ratio between the detected voltage to be supplied to the first servo amplifier and the detected voltage to be supplied to the second servo amplifier deviates from a predetermined voltage ratio.

* * * * *